(12) United States Patent
Inai et al.

(10) Patent No.: US 8,482,875 B2
(45) Date of Patent: Jul. 9, 2013

(54) TAPE LIBRARY CONTROL APPARATUS AND TAPE LIBRARY CONTROL METHOD

(75) Inventors: Yusuke Inai, Kawasaki (JP); Motohiro Sakai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 349 days.

(21) Appl. No.: 13/015,712

(22) Filed: Jan. 28, 2011

(65) Prior Publication Data

US 2011/0188148 A1    Aug. 4, 2011

(30) Foreign Application Priority Data

Feb. 2, 2010    (JP) .................................. 2010-021660

(51) Int. Cl.
*G11B 19/02*    (2006.01)
*G06F 11/00*    (2006.01)

(52) U.S. Cl.
USPC ............................................. 360/69; 714/42

(58) Field of Classification Search
None
See application file for complete search history.

(56) References Cited

U.S. PATENT DOCUMENTS 7,809,990 B2 * 10/2010 Sasaki ............................. 714/42

FOREIGN PATENT DOCUMENTS

| JP | 2000-339820 A | 12/2000 |
| JP | 2006-294240 A | 10/2006 |

* cited by examiner

*Primary Examiner* — K. Wong
(74) *Attorney, Agent, or Firm* — Fujitsu Patent Center

(57) ABSTRACT

A tape library control apparatus includes a storage for storing configuration information, a diagnostic evaluator, and a command controller. A tape library apparatus includes may include a plurality of tape drives and a plurality of magnetic tapes which includes specific magnetic tapes assigned for respective pieces of data specified by each data request issued by a host computer and a common magnetic tape provided for writing the respective pieces of the data. The diagnostic evaluator determines a use mode of the tape library apparatus on the basis of the configuration information. When the total number of the specific magnetic tapes is higher than the number of available tape drives, the use mode is determined and a command is issued to the tape library apparatus from the command controller to write data to the specific magnetic tape and to write to the common magnetic tape the respective pieces of the data.

18 Claims, 12 Drawing Sheets

FIG. 3

| TAPE DRIVE INFORMATION | STATUS | MOUNT INFORMATION |
|---|---|---|
| TAPE DRIVE #a | NORMAL | MAGNETIC TAPE #a |
| TAPE DRIVE #b | NORMAL | MAGNETIC TAPE #b |
| ⋮ | ... | ... |
| TAPE DRIVE #i | NORMAL | MAGNETIC TAPE #i |
| ⋮ | ... | ... |
| TAPE DRIVE #n | NORMAL | MAGNETIC TAPE #n |

| WRITE DATA | WRITE DESTINATION MAGNETIC TAPE |
|---|---|
| DATA A | MAGNETIC TAPE #1 |
| DATA B | MAGNETIC TAPE #2 |
| DATA C | MAGNETIC TAPE #3 |
| DATA X | MAGNETIC TAPE #1 |
| DATA Y | MAGNETIC TAPE #2 |
| DATA Z | MAGNETIC TAPE #3 |

FIG. 4B

| WRITE DATA | WRITE DESTINATION MAGNETIC TAPE |
|---|---|
| DATA A | MAGNETIC TAPE #1 |
| DATA X | MAGNETIC TAPE #1 |
| DATA B | MAGNETIC TAPE #2 |
| DATA Y | MAGNETIC TAPE #2 |
| DATA C | MAGNETIC TAPE #3 |
| DATA Z | MAGNETIC TAPE #3 |

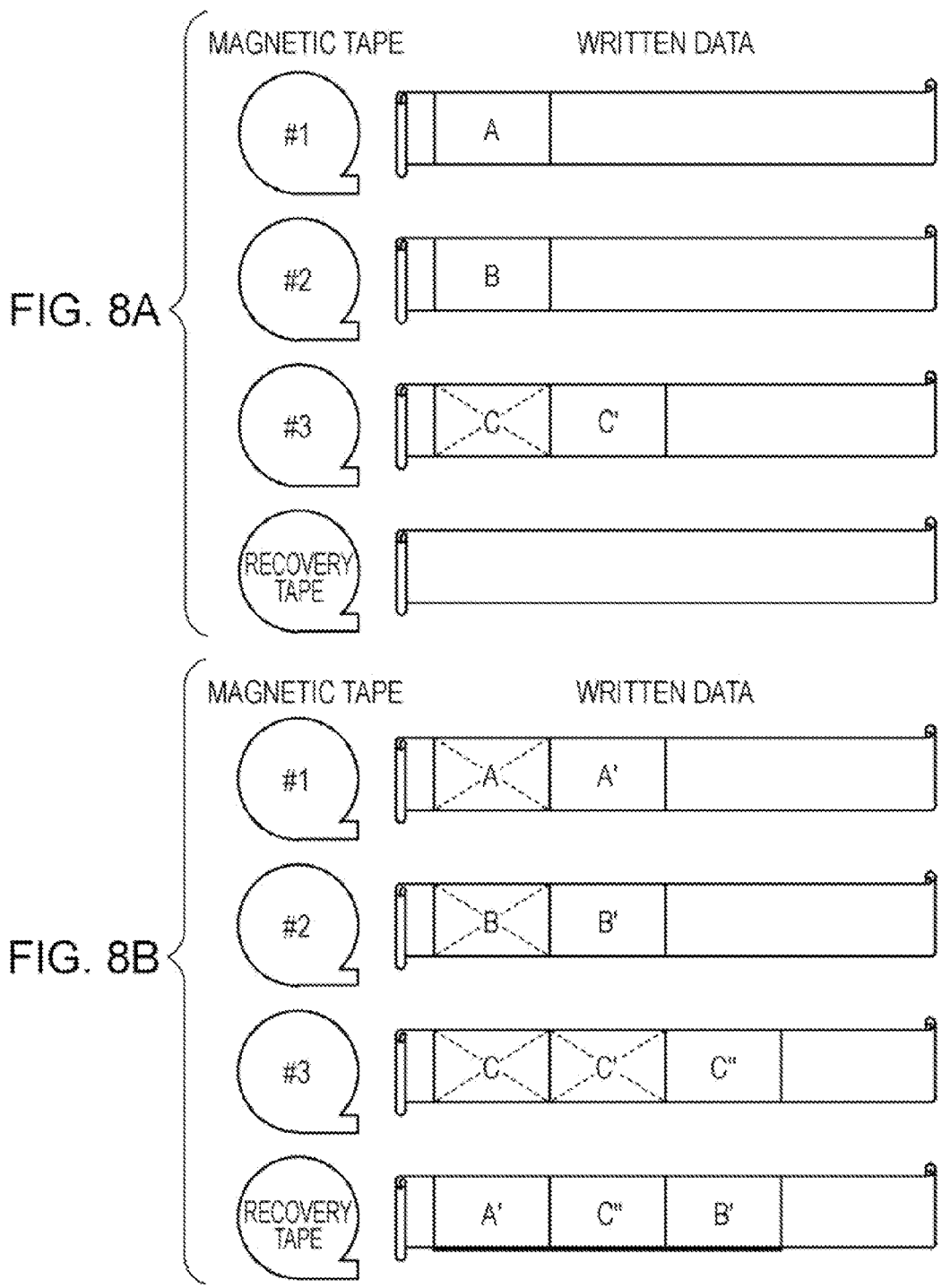

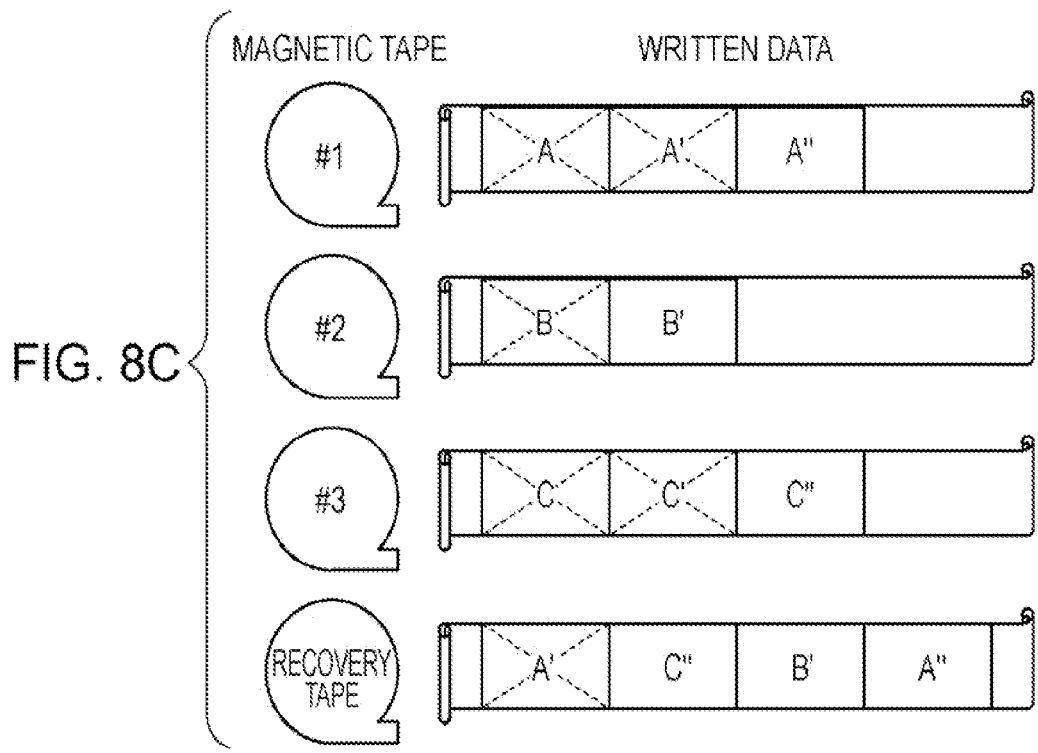

TAPE LIBRARY CONTROL APPARATUS AND TAPE LIBRARY CONTROL METHOD

CROSS-REFERENCE TO RELATED APPLICATION

This application is based upon and claims the benefit of priority of the prior Japanese Patent Application No. 2010-021660, filed on Feb. 2, 2010, the entire contents of which are incorporated herein by reference.

FIELD

The embodiments discussed herein are related to tape library control apparatuses and tape library control methods.

BACKGROUND

Hitherto, a tape library apparatus has been used as a memory device or a storage device in a computer system. The tape library apparatus usually has a combination of a plurality of tape drives and shelves (cells) in which magnetic tapes are accommodated. A tape drive is referred to as a tape drive hereinafter. The tape library apparatus is used for the purposes of data backup, improved continuity of business activities, interlocking between different types of server apparatuses and so on. The tape drive may write data to the magnetic tape and/or reads data from the magnetic tape which are mounted in the tape drives from the cells.

The tape library apparatus has a plurality of tape drives and data may be written and read to and from the corresponding tape drives independently. For example, designated data or data group is backed up to a predetermined magnetic tape or a magnetic tape group including a plurality of magnetic tapes in backup process.

The backup processing according to a conventional technology provides a magnetic tape to write and read for each designated data. Data are stored on magnetic tapes independently. Thus, the tape library apparatus is required to have the equal number of tape drives to the number of magnetic tapes.

Conventional technologies are described in, for example, Japanese Laid-open Patent Publication No. 2006-294240 and Japanese Laid-open Patent Publication No. 2000-339820.

SUMMARY

According to an aspect of the invention, a tape library control apparatus includes a configuration information storage, a diagnostic evaluator, and a command controller. The configuration information storage is configured to store configuration information on the number of available tape drives among a plurality of tape drives and the number of specific magnetic tapes. The tape drives and the specific magnetic tapes are provided in a tape library apparatus and the available tape drives are available for writing data to and reading data from each of magnetic tapes provided therein, where each of the specific magnetic tapes is assigned for respective pieces of data sent by a host computer. The diagnostic evaluator is configured to determine a use mode of the tape library apparatus on the basis of comparison between the number of the specific magnetic tapes and the number of the available tape drives and to output a request in accordance with the determined use mode. The use mode is selected from a first mode and a second mode, where the first mode is selected when the number of the specific magnetic tapes is higher than the number of the available tape drives and the second mode is selected when the number of the specific magnetic tapes is lower than or equal to the number of the available tape drives. The command controller is configured to output in response to the request a command to the tape library apparatus to instruct, when the use mode is determined as the first mode, to write first data to one of the specific magnetic tapes and to write the first data to a common magnetic tape provided for writing the respective pieces of the data, where the first data is sent from the host computer and the one of the specific magnetic tape is assigned for the first data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is an example of configuration information according to the second embodiment;

FIGS. 4A and 4B are examples of a write list (before optimized) and a write list (after optimized) according to the second embodiment;

FIGS. 8A to 8C are diagrams illustrating a magnetic tape writing method in normal mode, the method in recovery mode, and the method when write data is updated in the recovery mode according to the second embodiment;

DESCRIPTION OF EMBODIMENTS

Figure 1:
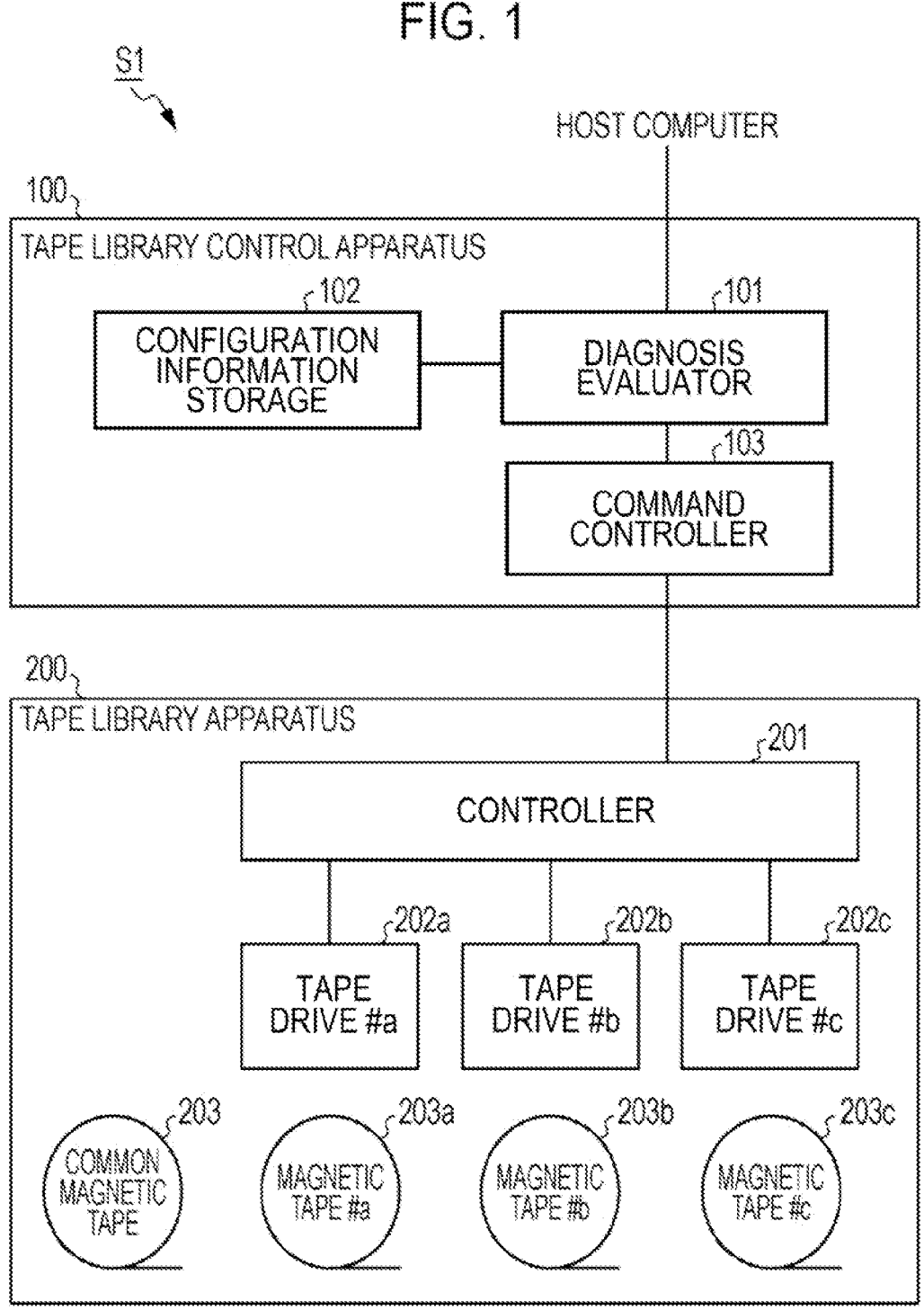
FIG. 1 is a block diagram illustrating a configuration of a tape library system according to a first embodiment.

According to the conventional technology, the fewer tape drives may be required to access to magnetic tapes of which the number is higher than that of available tape drives.

For example, when the number of available tape drives is reduced by a failure in a tape drive or devices, the reduced number of tape drives may be required to access many magnetic tapes. This may lead to replacement of magnetic tape, that is, magnetic tape unmount/mount. As a result, the replacement causes a bottleneck of processing times relating to data access to the magnetic tapes. Thus, when a magnetic tape replacement occurs, the processing time increases until the completion of data reading or data writing from or to the magnetic tape, which causes inefficient data access.

Hereinafter, embodiments of a tape library control apparatus, tape library control method and tape library control program for implementing the present invention will be described in detail with reference to drawings. A tape library system according to the embodiments which will be described below includes a host computer, a tape library apparatus which stores data received from the host computer, and a tape library control apparatus which controls the tape library apparatus.

A magnetic tape in the embodiments which will be described below is a magnetic tape cartridge containing a magnetic tape in a package such as a rectangular case. The host computer instructs data writing along with the write destination tape. The correspondence relationship between the number of kinds of data and the number of magnetic tapes is one to n or m to n where m and n are natural numbers. The expression "data of the host computer" refers to data to be read and/or written by the host computer from and to a magnetic tape.

The tape library apparatus described below includes a plurality of tape drives to which a magnetic tape storing data is to be inserted. Each of the tape drives executes data reading and writing processing on the inserted magnetic tape based on the instruction from the host computer.

If the magnetic tape assigned to the data by the host computer is not inserted to none of the plurality of tape drives, the tape library apparatus inserts the magnetic tape assigned to the data to one of the tape drives.

If all of the plurality of tape drives contain magnetic tapes, one of the tape drives ejects the magnetic tape therein and receives the magnetic tape assigned to the data. The magnetic tape ejection and insertion is called "replacement".

The magnetic tape cartridges inserted to none of tape drives are stored in shelves (cells) in the tape library apparatus. Since the tape library apparatus knows the shelf storing the magnetic tapes, a target magnetic tape may be removed from the shelf and be inserted to some tape drive.

First Embodiments

Summary of First Embodiment

According to a first embodiment, the magnetic tapes are may be assorted to two types, one is used only for the data specified by the host computer and the other is used for all data pieces or a plurality data pieces provided by the host computer. Hereinafter, the case will be described in which a data piece from the host computer is to be written to a magnetic tape. The host computer may read data from a magnetic tape similarly.

A magnetic tape used only for the data specified by the host is referred to as an assigned magnetic tape and a magnetic tape used for the all data pieces is referred to as a common magnetic tape. When the common magnetic tape is used in the tape library apparatus, replacement of the common magnetic tape is not performed after the common magnetic tape is inserted to a predetermined tape drive. On the other hand, the tape library apparatus may sometimes replace the assigned magnetic tape.

The tape library apparatus writes data from the host computer to the assigned magnetic tape and also to the common magnetic tape. Data from the host computer may immediately be written to the common magnetic tape without replacement. On the other hand, data from the host computer is written to the assigned magnetic tape after the replacement.

The response to the request to write the data may be transmitted to the host computer at the completion of data writing to the common magnetic tap even before the completion of data writing to the assigned magnetic tape. Thus, the response to the request to write the data from the host computer may quickly be transmitted to the host computer. The host computer may be quickly released from waiting for the completion of data writing without influence of the waiting time due to the magnetic tape replacement.

[Configuration of Tape Library System According to First Embodiment]

FIG. 1 is a block diagram illustrating a configuration of a tape library system according to the first embodiment. As illustrated in FIG. 1, a tape library system 51 according to the first embodiment includes a tape library control apparatus 100 and a tape library apparatus 200 to be controlled by the tape library control apparatus 100. The tape library control apparatus 100 is connected to the host computer, not illustrated. An input and output devices such as a keyboard and a monitor may be coupled to the tape library control apparatus 100.

The tape library control apparatus 100 includes a diagnostic evaluator 101, a configuration information storage 102, and a command controller 103. The diagnostic evaluator 101 is a processing unit such as a CPU (central processing unit) and an MPU (micro processing unit). The configuration information storage 102 is a storage such as a magnetic disk or a ROM (read only memory). The command controller 103 includes an interface device and CPU (or MPU), where the interface device is for data transmission and reception between the CPU (or the MPU) and the tape library apparatus 200.

On the basis of configuration information stored in the configuration information storage 102, the diagnostic evaluator 101 compares the total number of magnetic tapes assigned to data from the host computer and the number of available tape drives in the tape library apparatus. In accordance with the comparison result, the operation mode applied to the tape library apparatus 200 is determined as one between a "first mode" and a "second mode".

In other words, if the total number of magnetic tapes assigned to data of the host computer exceeds the number of available tape drives, the diagnostic evaluator 101 determines to operate the tape library apparatus 200 in the "first mode". If not, the diagnostic evaluator 101 determines to operate the tape library apparatus 200 in the "second mode".

At least one magnetic tape is assigned to each data piece of the data of the host computer, and a plurality of magnetic tapes may be also assigned thereto. The total number of the assigned magnetic tapes (assigned to the data of the host computer) is the total number of magnetic tapes a plurality of which may be assigned to one data piece.

In the "first mode", data from the host computer is written to the corresponding magnetic tape assigned to the data and is also written to the common magnetic tape. In the "second mode", data from the host computer is written to the corresponding magnetic tape assigned to the data.

If the total number of magnetic tapes assigned to the data pieces of the host computer exceeds the number of available tape drives in the tape library apparatus, the magnetic tape replacement occurs. If not, the magnetic tape replacement does not occur.

If the diagnostic evaluator 101 determines the "first mode", the diagnostic evaluator 101 instructs the command controller 103 to output a command to write the data requested to write by the host computer to the assigned magnetic tape which is assigned to the data and the common magnetic tape. If the diagnostic evaluator 101 determines the "second mode", the diagnostic evaluator 101 instructs the command controller 103 to output a command to write the data requested to write from the host computer only to the assigned magnetic tape which is assigned to the data.

The command controller 103 outputs to the tape library apparatus 200 the data to be written on a magnetic tape and a command to write the data to an identified magnetic tape when receiving from the diagnostic evaluator 101 a request including data for identifying the magnetic tape and an instruction for issuing the command.

The tape library apparatus 200 includes a controller 201, a tape drive #a 202a to a tape drive #c 202c, a common magnetic tape 203, a magnetic tape #a 203a, a magnetic tape #b 203b, and a magnetic tape #c 203c. The controller 201 includes an interface device for data transmission and reception between the CPU (or MPU) and the tape library apparatus 200.

The tape drive #a 202a, tape drive #b 202b, and tape drive #c 202c are drive devices which read and write data from and to the magnetic tapes inserted thereto. The common magnetic tape 203, magnetic tape #a 203a, magnetic tape #b 203b, and magnetic tape #c 203c are magnetic tape cartridges, such as box like, having magnetic tapes as storage media.

Upon receiving a command output from the tape library control apparatus 100 and data corresponding to the command, the controller 201 controls processing of writing the data to a magnetic tape. If the received command is an instruction to write the data to the common magnetic tape 203 and the magnetic tape assigned to the data, the controller 201 inserts the common magnetic tape 203 to the tape drive #a 202a and writes the data by priority. In this case, the tape drive #a 202a is a predetermined tape drive. If the common magnetic tape 203 has already been inserted to the tape drive #a 202a, the data is immediately written to the common magnetic tape 203.

When the data writing to the common magnetic tape 203 completes, the controller 201 transmits a writing completion notification to the command controller 103 in the tape library control apparatus 100. Upon receiving the completion notification, the command controller 103 instructs the diagnostic evaluator 101 to output a completion notification regarding the data writing request to the host computer.

The controller 201 then inserts the magnetic tape assigned to the data to either tape drive #b 202b or tape drive #c 202 and writes the data thereon. If the magnetic tape assigned to the data is not contained in both of the tape drive #b 202b and the tape drive #c 202c, the magnetic tape replacement is performed in the tape drive.

In this case, the magnetic tape to be ejected from the tape drive may be a magnetic tape with low priority of data writing/reading, for example. If the magnetic tape assigned to the data has already been inserted to either tape drive #b 202b or tape drive #c 202c, the data is immediately written to the magnetic tape.

Upon receiving the command to instruct to write the data only on the magnetic tape assigned to the data, the controller 201 inserts the magnetic tape assigned to the data to one of the tape drives and writes the data thereon. If the magnetic tape assigned to the data has already been inserted to one of the tape drives, the data is immediately written to the magnetic tape.

If the magnetic tape assigned to the data is not contained in any of the tape drives, the magnetic tape replacement is performed in one of the tape drives. The magnetic tape to be ejected from the tape drive may be a magnetic tape with low priority of data writing/reading, for example.

After completion of the data writing to the magnetic tape assigned to the data completes, the controller 201 outputs the writing completion notification to the command controller 103 in the tape library control apparatus 100. If the command controller 103 receives the completion notification, the command controller 103 instructs the diagnostic evaluator 101 to output the completion notification regarding the data writing request to the host computer.

According to the first embodiment, since all of the data of the host computer are written to the common magnetic tape 203, the writing waiting time due to the magnetic tape replacement may be reduced, and the data writing completion notification may be quickly transmitted to the host computer.

Second Embodiments

Summary of Second Embodiment

According to the second embodiment, when at least one of a plurality of tape drives included in a tape library apparatus fails, the data from the host computer is written to a common magnetic tape provided for writing all data from the host computer in addition to the magnetic tape assigned to the data. Hereinafter, the second embodiment will be described about differences from the first embodiment. The explanation will be described in the case where data from the host computer is written to a magnetic tape. The host computer may read data from a magnetic tape similarly.

[Configuration of Tape Library System According to Second Embodiment]

Figure 2:
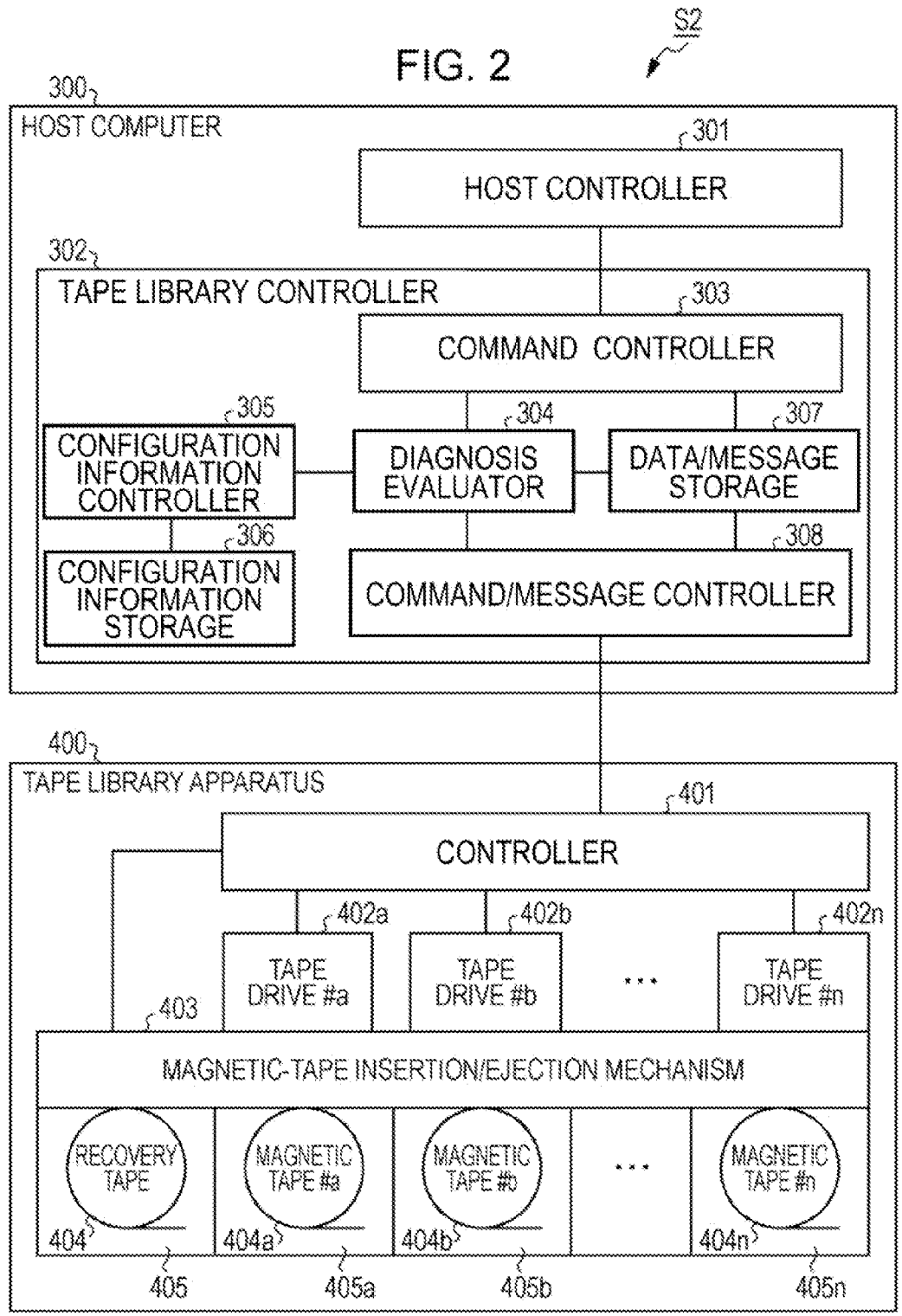
FIG. 2 is a block diagram illustrating a configuration of a tape library system according to a second embodiment.

FIG. 2 is a block diagram illustrating a configuration of a tape library system according to the second embodiment. As illustrated in FIG. 2, a tape library system S2 according to the second embodiment includes a host computer 300 and a tape library apparatus 400. The tape library apparatus 400 is coupled to the host computer 300.

The host computer 300 includes a host controller 301, and a tape library controller 302. The host controller 301 is a processing unit such as an MPU or a CPU that is responsible for control over the entire host computer 300. The host computer 300 includes a temporary storage such as a RAM (random access memory) and a storage such as a magnetic disk and/or a ROM which are not illustrated.

The tape library controller 302 includes a command controller 303, a diagnostic evaluator 304, a configuration information controller 305, a configuration information storage 306, a data/message storage 307, and a command/message controller 308.

If the command controller 303 receives a request to write data from the host controller 301, the command controller 303 outputs a write request to the diagnostic evaluator 304. The command controller 303 stores the data transmitted from the host controller 301 along with the write request to the data/message storage 307. The command controller 303 then transmits the response to the write request to the host controller 301.

If the command controller 303 receives a request to read data from the host controller 301, the command controller 303 outputs a read request to the diagnostic evaluator 304. The command controller 303 then transmits the data stored in the data/message storage 307 and the response to the request to read the data to the host controller 301.

The diagnostic evaluator 304 is a processing unit comprised of, for example, a CPU or an MPU. Analyzing the request from the host controller 301, the diagnostic evaluator 304 performs the following processing. The diagnostic evaluator 304 inquires the current state of the tape library apparatus 400 from the configuration information controller 305 and determines the mode for operating the tape library apparatus 400 between a "recovery mode" and a "normal mode".

In the recovery mode, the data from the host computer 300 is written to the magnetic tape assigned to the data and is also written to a recovery tape 404, which will be described below. In the normal mode, the data from the host computer 300 is only written to the magnetic tape assigned to the data.

The diagnostic evaluator 304 changes command information in accordance with the mode which has been decided. The command information is information on the magnetic tape as a destination to which the command is issued. An example of the command information is, for example, identification information given to each of the magnetic tapes. More specifically, if the diagnostic evaluator 304 determines the recovery mode as the operation mode of the tape library apparatus 300, the command information indicates the recovery tape 404, which will be described below, and the magnetic tape assigned to the data from the host computer. If the diagnostic evaluator 304 determines the normal mode, the command information indicates the magnetic tape assigned to the data from the host controller 301.

The command/message controller 308 receives information on the status of the tape library apparatus 400 and sends the information to the diagnostic evaluator 304. The diagnostic evaluator 304 further analyzes the information received from the tape library apparatus 400, which is responded from the command/message controller 308. If the state of the tape library apparatus 400 changes, the state change is notified to the configuration information controller 305.

The diagnostic evaluator 304 also requests the command/message controller 308 to issue the command in accordance with the command information to the tape library apparatus 400. More specifically, the command instructs the data writing by designating the magnetic tape assigned to the data in accordance with the data writing request from the host computer. Alternatively, the command instructs the data writing by designating the magnetic tape assigned to the data and the recovery tape 404, which will be described below, in accordance with the data writing request from the host controller.

The diagnostic evaluator 304 further analyzes the execution result of the command, such as the results of executions performed by the requests for data writing and data reading, received from the tape library apparatus 400, which is responded from the command/message controller 308, and the data stored in the data/message storage 307. Information indicating "failure" is found by the analysis in the execution result of the command received from the tape library apparatus 400, the diagnostic evaluator 304 takes a predetermined measure such as alarming an operator. The diagnostic evaluator 304 further also requests the command controller 303 to transmit a response to the request from the host controller.

Upon receiving the request from the diagnostic evaluator 304, the configuration information controller 305 updates or reads the configuration information of the tape library apparatus 400 which is stored in the configuration information storage 306. The configuration information storage 306 is a storage such as a magnetic disk or a ROM. The configuration information at least includes information on the tape drives included in the tape library apparatus 400, the normal/failed states of the tape drives and information on the magnetic tapes contained in the tape drives.

The data/message storage 307 stores data to be written to a magnetic tape in the tape library apparatus 400, data read from a magnetic tape, and a message transmitted from the tape library apparatus 400. The message may indicate a failure in a tape drive included in the tape library apparatus 400, for example.

If a tape drive included in the tape library apparatus 400 fails, the tape library apparatus 400 transmits the notification of the failure in the magnetic tape stored in the tape drive to the tape library controller 302 in the host computer 300. The command/message controller 308 stores the received notification of the failure in the magnetic tape data/message storage 307. The diagnostic evaluator 304 analyzes the notification of the failure which is stored in the data/message storage 307. Then the diagnostic evaluator 304 instructs the configuration information controller 305 to update the configuration information so as to correspond to the failure of the magnetic tape.

In response to the instruction from the diagnostic evaluator 304, the command/message controller 308 issues a command to the tape library apparatus 400. If the command is a write request, the command/message controller 308 also transmits the data stored in the data/message storage 307 to the tape library apparatus 400.

If the command is a read request, the command/message controller 308 stores the data transmitted from the tape library apparatus 400 which is read from the magnetic tape based on the command as the read request to the data/message storage 307.

The tape library apparatus 400 includes a controller 401 which includes a CPU (or MPU) and an interface device for data transmission and reception to and from the tape library apparatus 200. The tape library apparatus 400 includes a tape drive #a 402a to a tape drive #n 402n. The tape library apparatus 400 further includes the recovery tape 404 stored in a cell 405 and a magnetic tape #a 404a stored in a cell 405a to a magnetic tape #n 404n stored in a cell 405n.

The tape library apparatus 400 includes a magnetic tape insertion/ejection mechanism 403 which removes a magnetic tape from the corresponding cell to insert the magnetic tape to a tape drive and ejects a magnetic tape from a tape drive to store the magnetic tape to the corresponding cell under the control of the controller 401. The controller 401 is coupled with the tape drives, the magnetic insertion/ejection mechanism 403, and the command/message controller 308 each other.

If the controller 401 detects that one of the tape drives is failed, the controller 401 transmits a message notifying the failure to the host computer 300. Upon receiving the message, the tape library controller 302 updates the configuration information of the tape library apparatus 400 stored in the configuration information storage 306. By updating the configuration information, information indicating the normal or failed state of the tape drive detected as being in failure state changes to information indicating "failed" state. After this, if the states of the tape drives in the configuration information include the "failed" state, the tape library apparatus 400 is operated in the "recovery mode". If the states of the tape drives in the configuration information do not include the "failed", the tape library apparatus 400 is operated in the "normal mode".

Upon receiving a command output by the tape library controller 302 and the data to be written to a magnetic tape associated with the command, the controller 401 controls processing of writing the data to the magnetic tape. If the command is an instruction to write the data both to the recovery tape 404 and to the magnetic tape assigned to the data, the controller 401 inserts the recovery tape 404 to the tape drive #a 402a and writes the data on a priority basis. In this case, the tape drive #a 402a is the predetermined tape drive.

The data is immediately written to the recovery tape 404 when the recovery tape 404 has already been inserted to the tape drive #a 402a. The tape drive for mounting the recovery tape 404 may be a tape drive with the first identification information or the last identification information among available tape drives without failures. Alternatively, it may be a tape drive which does not contain a magnetic tape among available tape drives. It is also preferable to insert the recovery tape 404 into the tape drive which is designated as a low-priority one for the data writing.

After completion of writing the data to the recovery tape 404, the controller 401 transmits the writing completion notification to the command/message controller 308. Upon receiving the completion notification, the command/message controller 308 instructs the diagnostic evaluator 101 to transmit the completion notification regarding the data writing request to the host controller 301.

The controller 401 writes the data from the host computer 300 to the recovery tape in the order of the data received by the controller 401. The controller 401 the data to the magnetic tape assigned to the data by the controller 401 as follows. That is, before transmitting the command, the command/message controller 308 generates a write list 307a illustrated in FIG. 4A in which the identification information of write data is related to the identification information of a write destination magnetic tape to which the write data will be written. The generated write list 307a is stored in the data/message storage 307.

Then the write list 307a is optimized by using the identification information of the write destination magnetic tape as a key. The first identification information on the write list 307a is the identification information of the write destination magnetic tape corresponding to the command to be transmitted first among the identification information of the write destination magnetic tapes. In other words, the data writing order is optimized such that the number of times of ejecting/inserting a magnetic tape from/to the tape drive may be a minimum when data is written to the corresponding magnetic tape.

The command/message controller 308 reads the optimized write list 307a information from the data/message storage 307 and transmits the list 307a information to the tape library apparatus 400. Receiving the optimized write list 307a information from the host computer 300, the controller 401 writes each of the data sets to the respective magnetic tapes in the order decided in the write list 307a.

[Configuration Information]

FIG. 3 illustrates an example of configuration information according to the second embodiment. As illustrated in FIG. 3, the configuration information on the tape library apparatus 400 associates status information and mount information with tape drive information being identification information of a tape drive. The status information indicates whether the tape drive identified by the tape drive information is operable or not operable. The mount information is identification information of the magnetic tape contained in the tape drive identified by the tape drive information.

The configuration information is updated on the basis of the information transmitted from the tape library apparatus 400. The configuration information provides the number of tape drives included in the tape library apparatus 400, identification information of the tape drives, each status of the tape drives, and identification information of the magnetic tapes contained in the tape drives.

[Write List]

FIGS. 4A and 4B illustrate examples of write lists before and after optimized, respectively. The write list 307a before optimized includes each pieces of write data information such as "data A", "data B", "data C", "data X", "data Y", and "data Z" in the order. The data A to data C and data X to data Z are associated with "write destination magnetic tapes" information such as "magnetic tape #1", "magnetic tape #2", "magnetic tape #3", "magnetic tape #1", "magnetic tape #2", and "magnetic tape #3".

When the data are written to the magnetic tapes in the order and if the number of available tape drives is lower than the number of magnetic tapes, the magnetic tape may be required to replace every time data is written. For that reason, the magnetic tape replacement occurs frequently, and the efficiency of data writing decreases.

Accordingly, the write list 307a is optimized as illustrated in FIG. 4B. More specifically, the order of "write data" is optimized by using the "write destination magnetic tape" as a key. It is assumed in the write list 307a before optimized, the "magnetic tape #1" is arranged at the beginning also after the optimization since the "magnetic tape #1" is at the beginning of the "write destination magnetic tapes". As a result, "write data" are listed as "data A", "data X", "data B", "data Y", "data C", and "data Z". The "data A", "data X", "data B", "data Y", "data C", and "data Z" are associated with the "write destination magnetic tapes" of "magnetic tape #1", "magnetic tape #1", "magnetic tape #2", "magnetic tape #2", "magnetic tape #3", and "magnetic tape #3", respectively.

Writing the data to the corresponding magnetic tapes in the order only requires the magnetic tape replacement twice of from the "magnetic tape #1" to the "magnetic tape #2" and from the "magnetic tape #2" to the "magnetic tape #3" even if the number of available tape drives is lower than the number of magnetic tapes. The processing described above may minimize the number of times of magnetic tape replacement to improve the efficiency of data writing.

The order of inserting the magnetic tapes #1 to #3 to the tape drives may be changed in accordance with the total amount of data to be written to corresponding magnetic tapes. For example, the total amount of data B and data Y to be written to the magnetic tape #2 may be 1 GB, but the total amount of data C and data Z to be written to the magnetic tape #3 may be 50 MB. In this case, the magnetic tape #3 may be inserted to the tape drive first to write the less data.

[Mode Determination Processing According to Second Embodiment]

Figure 5:
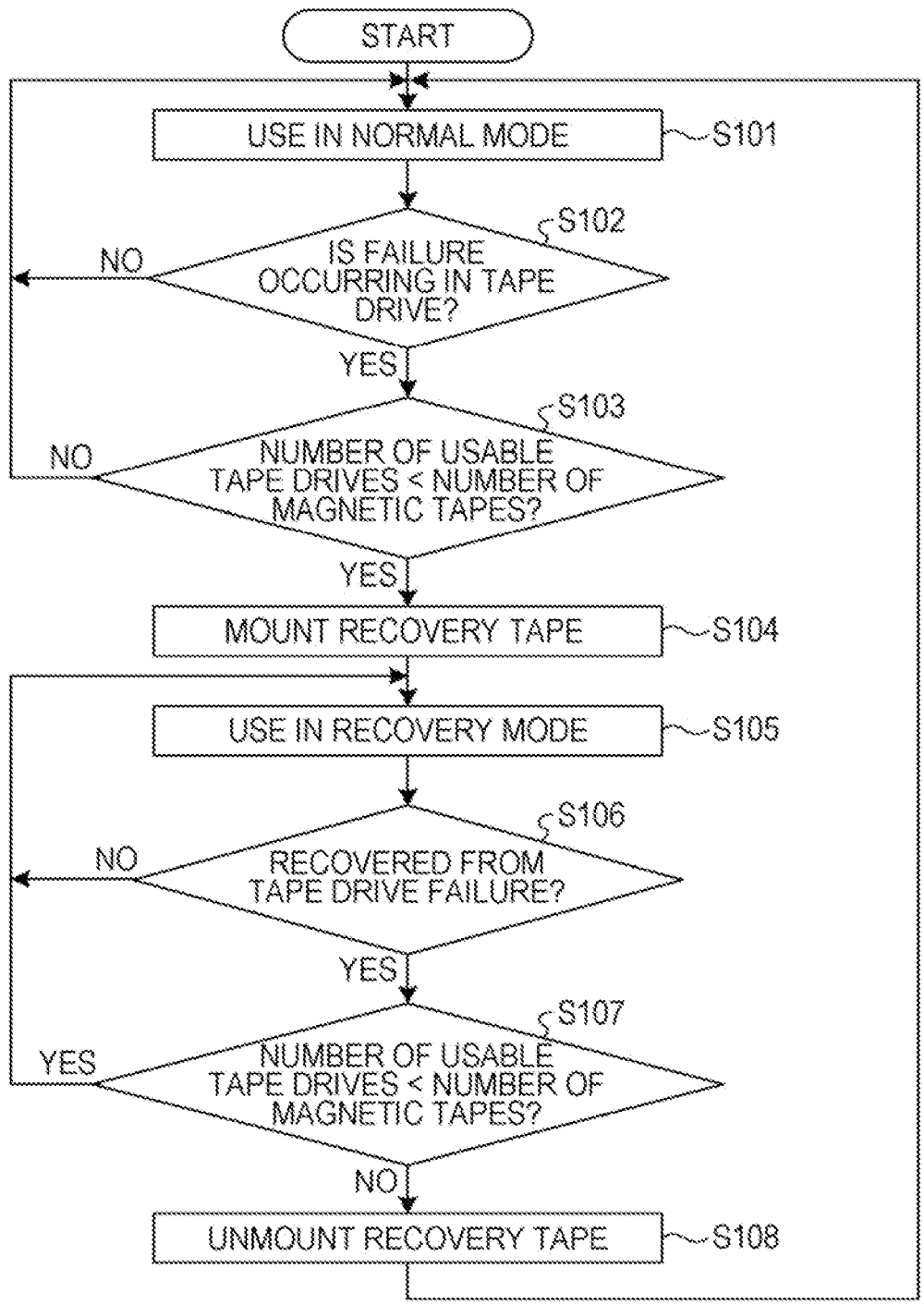
FIG. 5 is a flowchart illustrating a mode determination processing routine according to the second embodiment.

FIG. 5 is a flowchart illustrating a mode determination processing routine according to the second embodiment. The magnetic tape use processing (recovery mode) is performed by the tape library controller 302. First of all, the diagnostic evaluator 304 uses the tape library apparatus 400 in the "normal mode". The diagnostic evaluator 304 then determines whether any tape drive has a failure or not (operation S102) on the basis of the result of the diagnosis on configuration information of the tape library apparatus 400, which is stored in the configuration information storage 306 and acquired by requesting to the configuration information controller 305.

If it is determined that some tape drive has a failure (Yes in operation S102), the processing moves to operation S103. If not (No in operation S103), the processing moves to operation S101.

In operation S103, on the basis of the result of the analysis on the configuration information of the tape library apparatus 400, the diagnostic evaluator 304 determines whether the number of available tape drives is lower than the number of magnetic tapes or not. In other words, whether, in the tape library apparatus 400, the number of available tape drives is lower than the number of magnetic tapes assigned to be used for the data of host computer 300 or not is determined. The processing in operation S103 will be called "determination on drive reduction".

If it is determined that the number of available (operable) tape drives is lower than the number of magnetic tapes (Yes in operation S103), the processing moves to operation S104. If not (No in operation S103), the processing moves to operation S101.

In operation S104, the diagnostic evaluator 304 instructs the command/message controller 308 to transmit a command to the tape library apparatus 400 to mount the recovery tape 404 to a predetermined tape drive. Upon receiving the instruction for mounting the recovery tape 404, the controller 401 controls the magnetic tape insertion/ejection mechanism 403 so as to insert the recovery tape 404 to the predetermined tape drive. The diagnostic evaluator 304 then determines to use the tape library apparatus 400 in the "recovery mode" (operation S105).

The diagnostic evaluator 304 then determines whether the tape drive failure has recovered or not (operation S106) on the basis of the result of the analysis on configuration information of the tape library apparatus 400, which is stored in the configuration information storage 306 and acquired by requesting to the configuration information controller 305.

If it is determined that the tape drive failure has recovered (Yes in operation S106), the processing moves to operation S107. If not (No in operation S106), the processing moves to operation S105.

In operation S107, the diagnostic evaluator 304 performs the same processing as operation S103. If it is determined that the number of available tape drives is lower than the number of magnetic tapes (Yes in operation S107), the processing moves to operation S105. If not (No in operation S107), the processing moves to operation S108. In operation S108, the command/message controller 308 transmits a command to the tape library apparatus 400 to unmount the recovery tape 404 from the tape drive in accordance with the request from the diagnostic evaluator 304. The tape library apparatus 400 having received the command ejects the recovery tape 404 from the tape drive.

[Magnetic Tape Writing Control Processing (Recovery Mode) According to Second Embodiment]

Figure 6:
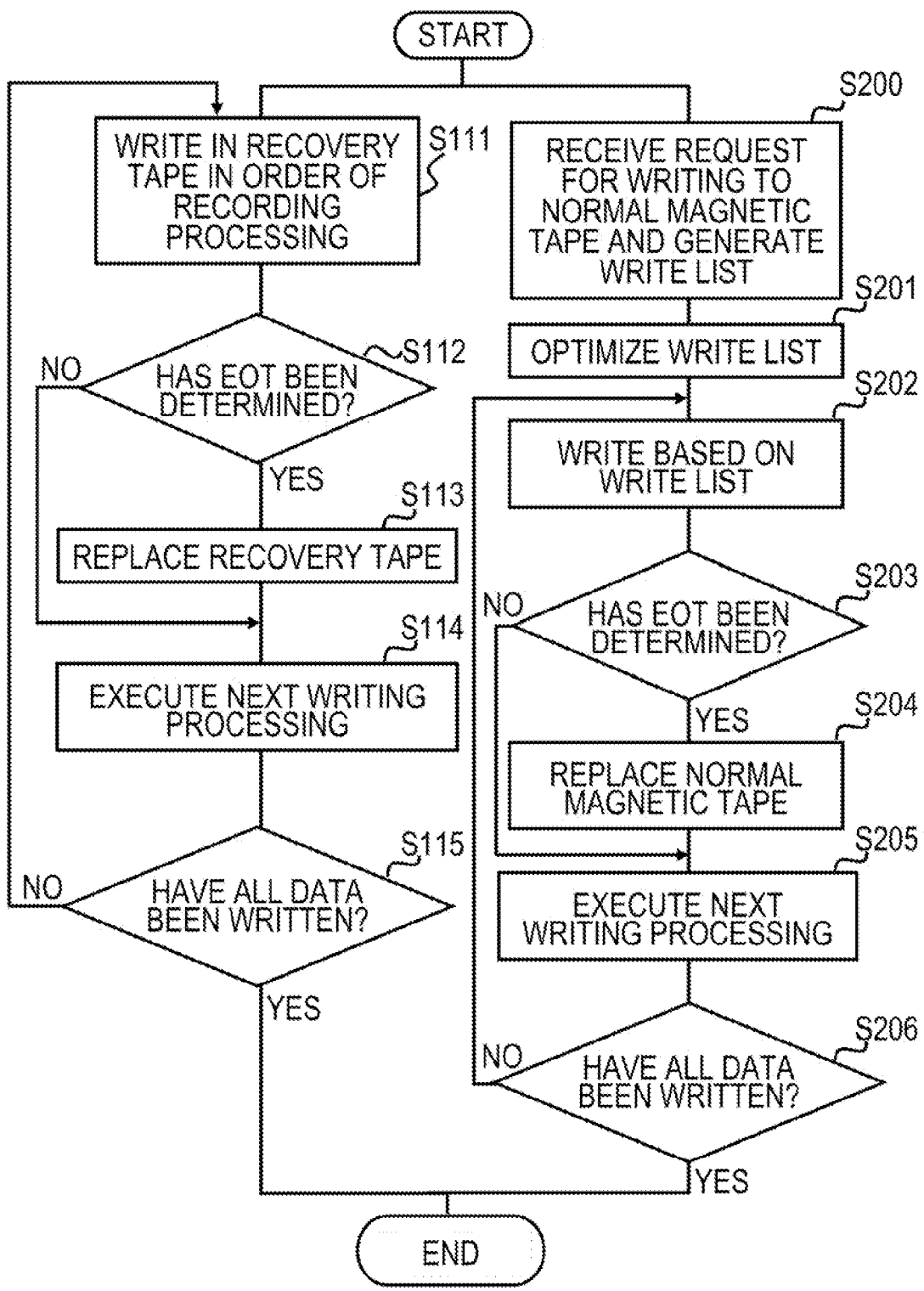
FIG. 6 is a flowchart illustrating a magnetic tape writing control processing routine according to the second embodiment.

FIG. 6 is a flowchart illustrating a magnetic tape writing control processing routine according to the second embodiment. The magnetic tape writing control processing is performed by the tape library controller 302. The processing in operation S111 to operation S115 is performed independently of and in parallel with the processing in operation S200 to operation S206.

In operation S111, the diagnostic evaluator 304 requests the command/message controller 308 to transmit to the tape library apparatus 400 a command to write the data to the recovery tape 404 in the order in which the data writing request has been received from the host controller 301. Upon receiving the command, the controller 401 instructs the tape drive containing the recovery tape 404 to write the data to the recovery tape 404.

Next, if the diagnostic evaluator 304 is notified of EOT (End Of Tape) from the tape drive containing the recovery tape 404 (Yes in operation S112), the diagnostic evaluator 304 requests the command/message controller 308 to transmit a command to replace the recovery tape 404 by another recovery tape 404 to the controller 401 (operation S113). EOT is detected when the recovery tape 404 has reached the tape end. If the diagnostic evaluator 304 is not notified of EOT from the tape drive containing the recovery tape 404 (No in operation S112), the processing moves to operation S114.

In operation S114, the diagnostic evaluator 304 requests the command/message controller 308 to transmit to the tape library apparatus 400 a command. The command is for writing to the recovery tape 404 the data next to the data requested previously to write by the host controller 301. Upon receiving the command, the controller 401 in the tape library apparatus 400 instructs the tape drive containing the recovery tape 404 to write the next date to the recovery tape 404.

Next, if the diagnostic evaluator 304 is notified from the tape library apparatus 400 of that all data requested to write by the host controller 301 have been written to the recovery tape 404 (Yes in operation S115), the control processing for data writing to the recovery tape ends. If not (No in operation S115), the processing moves to operation S111.

On the other hand, in operation S200, the diagnostic evaluator 304 requests the command/message controller 308 to generate the write list 307a of data to be written to the recovery tape 404 in accordance with the requests for data writing from the host controller 301. The command/message controller 308 then optimizes the generated write list 307a (operation S201).

Next, the command/message controller 308 transmits to the tape library apparatus 400 the write list 307a which is optimized to write data to a normal magnetic tape instead of the recovery tape 404 in accordance with the write list 307a (operation S202). Upon receiving the optimized write list 307a, the controller 401 in the tape library apparatus 400 writes the data to the corresponding magnetic tape in accordance with the write list 307a.

Then the processing moves to operations S203 to S205 for processing when the EOT is detected. Since the operations S203 to S205 are similar to the operations of operations S112 to S114, the explanation for the operations is omitted. Next, if the diagnostic evaluator 304 is notified from the tape library apparatus 400 of that all of the data requested to write from the host controller 301 have been written to the corresponding magnetic tape (Yes in operation S206), the magnetic-tape data writing control processing ends. If not (No in operation S206), the processing moves to operation S202.

In this way, writing the data corresponding to a write request from the host controller 301 to the recovery tape 404 by priority allows writing data directly to the recovery tape 404 without magnetic tape replacement.

[Magnetic Tape Reading Control Processing (Recovery Mode) According to Second Embodiment]

Figure 7:
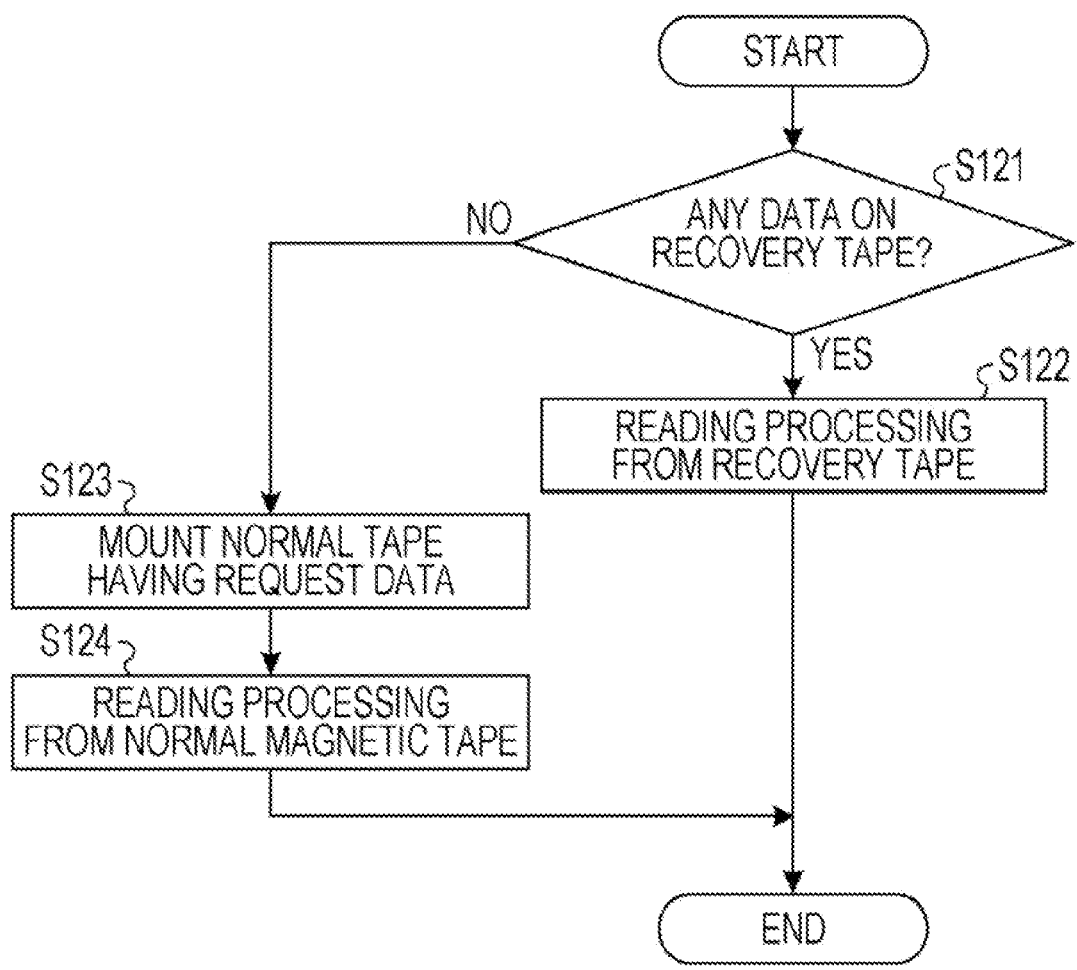
FIG. 7 is a flowchart illustrating a magnetic tape reading control processing (recovery mode) routine according to the second embodiment.

FIG. 7 is a flowchart illustrating a magnetic tape reading control processing (recovery mode) routine according to the second embodiment. The magnetic tape reading control processing is performed by the tape library controller 302.

First of all, in operation S121, the diagnostic evaluator 304 send to the command/message controller 308 a request so to demand from the tape library apparatus 400 an answer for whether the data corresponding to the read request from the host controller 301 exists on the recovery tape 404 or not.

If the data corresponding to the read request from the host controller 301 exists on the recovery tape 404 (Yes in operation S121), the diagnostic evaluator 304 performs the following processing. That is, the diagnostic evaluator 304 requests the command/message controller 308 to transmit to the tape library apparatus 400 a command to read the data from the recovery tape 404 (operation S122). Upon receiving the command, the controller 401 in the tape library apparatus 400 reads and transmits the corresponding data from the recovery tape 404 to the tape library controller 302.

On the other hand, if the data corresponding to the read request from the host controller 301 does not exist on the recovery tape 404 (No in operation S121), the diagnostic evaluator 304 performs the following processing. That is, the diagnostic evaluator 304 requests the command/message controller 308 to transmit to the tape library apparatus 400 a command to insert a normal magnetic tape storing the data to the tape drive (operation S123).

The diagnostic evaluator 304 then requests to transmit to the tape library apparatus 400 a command to read the data from the inserted normal magnetic tape (operation S124). The controller 401 in the tape library apparatus 400 having received the command reads and transmits the corresponding data from the magnetic tape storing the data to the tape library controller 302.

In this way, if the data corresponding to a read request from the host controller 301 exists on the recovery tape 404, the data may be directly read from the recovery tape 404 without magnetic tape replacement.

As described above, if a tape drive fails and the drive resource reduction is determined, a recovery tape storing redundant data is used by priority for data reading. Since this hardly requires recovery tape replacement, a searching operation on the tape is only required for data reading. Thus, the waiting time until the start of I/O (Input Output) processing for reading/writing data may be reduced. A request for the I/O processing normally to a plurality of tapes may be satisfied with one magnetic tape. Thus, when read requests are issued at the same time, the corresponding data may be read in a short period of time.

[Operations of Second Embodiment]

FIG. 8A illustrates a magnetic tape writing method (in normal mode) according to the second embodiment. As illustrated in FIG. 8A, in the normal mode, data A, B, and C are written to magnetic tapes #1, #2, and #3 assigned to write the data A, B, and C, respectively. A recovery tape is not inserted to any of the tape drives, and data is not written thereto. This state is called an "initial state". In this way, the recovery tape is not used in the normal mode. In FIG. 8A, the data C is updated to the data C', while the data C remains on the tape as the previous data.

FIG. 8B illustrates a magnetic tape writing method (in recovery mode) according to the second embodiment. It is assumed that a tape drive fails from the "initial state", and the number of available drives is reduced from three to two. Thus, the drive resource reduction is determined. After that, in order to write data A' to the magnetic tape #1 and the recovery tape, the magnetic tape #1 and recovery tape are inserted to the tape drives. The data A is updated to the data A' on the tape #1 and remains as the previous data.

In order to write data C", the data C" is added after the data A' without ejection of the recovery tape from the tape drive. On the other hand, since no tape drives are available for accepting the magnetic tape #3, the tape drive ejects the magnetic tape #1 to accept the magnetic tape #3. After that, the data C" is written to the magnetic tape #3. Thus, writing the data C" on the recovery tape completes the writing earlier than the writing on the magnetic tape #3 because of not requiring magnetic tape replacement.

Similarly, in order to write data B' on the recovery tape, the data B' is written after the data C" without ejection of the recovery tape from the tape drive. On the other hand, since no tape drives are vacant for the magnetic tape #2, the magnetic tape #3 is ejected, and the magnetic tape #2 is inserted to the tape drive. After that, the data B' is written to the magnetic tape #2. Thus, writing the data B' completes earlier on the recovery tape not requiring magnetic tape replacement.

The data B' may be written on the recovery tape successively to the completion of writing the data C" on the magnetic tape #3 without waiting for the completion of writing the data C" to the magnetic tape #3. Thus, writing the data B' on the recovery tape may complete further earlier.

In this way, giving a higher priority level to writing processing on the recovery tape, the data A', data C", and data B' may be written consecutively without ejection of the recovery tape during the processing. Data are written to the magnetic tapes #1 to #3 for normally writing the data A', data C", and data B' by performing magnetic tape replacement only when a vacant drive is available in addition to the tape drive containing the recovery tape. Thus, writing all of the requested data completes earlier on the recovery tape not requiring magnetic tape replacement.

As the result, data are written to the magnetic tapes as illustrated in FIG. 8B. This state will be called "State 1". The "recovery mode" is the processing mode in which data is written to a recovery tape by priority.

FIG. 8C illustrates a magnetic tape writing method for updating the write data in the recovery mode according to the second embodiment. It is assumed that the data A' written on the magnetic tape #1 is updated from "State 1" above. In this case, the updated data A" is written to the magnetic tape #1 and the recovery tape. The data A' before updated may be handled as being invalid data. The data reading processing on updated data from a magnetic tape may be performed in a conventional manner. As the result, data are written to the magnetic tapes, as illustrated in FIG. 8C. This state will be called "State 2".

The data previously written to the recovery tape before updating, such as A' in FIG. 8C, may be deleted by a conventional processing such as a re-organization function. However, since the frequency of use of the recovery tape is high in the drive resource reduction, the re-organization may be performed during a period in which the tape library system S2 is not operated for services. Further, the recovery tape may be set to exclude from the re-organization targets.

When data are written to the end of the recovery tape in drive resource reduction, the writing is taken over to another recovery tape. In other words, a plurality of recovery tapes may be prepared for each tape library. The processing of determining that data has been written to the end of a recovery tape is called "EOT determination".

If it is determined that the tape drive failure has recovered and the drive resource reduction ends, the recovery tape is no longer necessary and is ejected from the tape drive. However, the recovery tape may be kept as partial backup data. The function of keeping the recovery tape may be implemented by applying a magnetic-tape external storage/loading function for a tape library apparatus according to a technology in the past.

[Host Computer Which Executes Magnetic-Tape Use Processing Program According to Second Embodiment]

Figure 9:
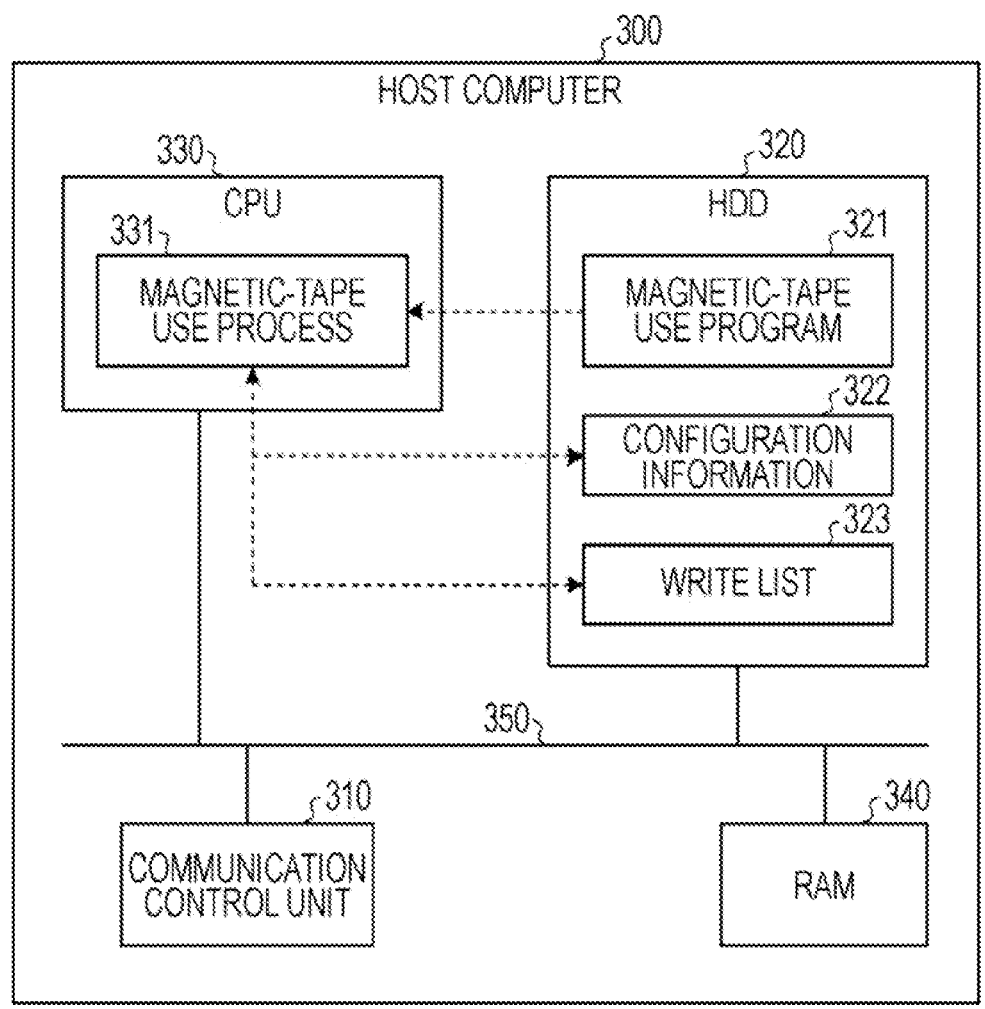
FIG. 9 is a diagram illustrating a host computer which executes a magnetic-tape use processing program according to the second embodiment.

FIG. 9 illustrates a host computer 300 which executes a magnetic-tape use processing program according to the second embodiment. The host computer 300 includes a communication controller 310, an HDD (hard disk drive) 320, a CPU 330, and a RAM 340, which are coupled with each other via a bus 350. The HDD 320 stores a magnetic tape use program 321, configuration information 322, and a write list 323.

The CPU 330 reads the magnetic tape use program 321 from the HDD 321 and executes the program 321 as a magnetic tape use process 331. The magnetic tape use process 331 performs mode determination processing illustrated in FIG. 5, magnetic tape writing control processing (recovery mode) illustrated in FIG. 6, and magnetic tape reading control processing (recovery mode) illustrated in FIG. 7. The magnetic tape use process 331 uses the RAM 340 as a temporary storage in performing any processing to access the configuration information 322 and write list 323 in the HDD 320 as required.

[Modified Examples of Second Embodiment]

According to the second embodiment, the tape library controller 302 is included in the host computer 300 to perform functions required. However, without limiting thereto, the tape library controller 302 may be included to function in a server apparatus such as a computer provided between the host computer 300 and the tape library apparatus 400.

According to the second embodiment, in the magnetic tape writing processing (recovery mode), the write list 307a is generated and optimized by the command/message controller 308. However, without limiting thereto, the write list 307a may be generated and optimized by the controller 401 in the tape library apparatus 400.

According to the second embodiment, the "drive resource reduction" refers to the state that the number of available drives is reduced by a failure. However, the "drive resource reduction" may be determined on the basis of the "number of times of tape replacement" which may be derived from the number of available tape drives and the type and number of the data processing requests. For example, if "the number of times of tape replacement" is equal to or higher than "the number of available tape drives", the "drive resource reduction" may be determined even when any tape drives have a failure.

According to the second embodiment, in the magnetic tape writing control processing, the processing in operation S111 to operation S115 in FIG. 6 is performed independent of and in parallel with the processing in operation S200 to operation S206. In other words, writing data to the recovery tape 404 and writing data to the magnetic tape assigned to the data are performed in accordance with different commands from the tape library controller 302.

In this case, the data writing to a recovery tape not requiring magnetic tape replacement completes earlier than the data writing to the magnetic tape assigned to the data. Thus, the tape library controller 302 transmits a command to instruct to write data only to the recovery tape 404 to the tape library apparatus 400. In the tape library apparatus 400, data may be written to the magnetic tape assigned to the data by copying the data from the recovery tape. Thus, not only the host controller 301 may be quickly released from the state waiting for a response to a data request to the tape library apparatus 400, but also the tape library controller 302 may be quickly released from the state waiting for the response to the data request.

According to the second embodiment, when the number of available tape drives is reduced by a failure in a tape drive, data of the host computer 300 is written to the magnetic tape assigned to the data and to the recovery tape 404. In this case, priority is given to the writing to the recovery tape 404. When the writing to the recovery tape 404 completes, the completion notification regarding the data writing is transmitted to the host computer 300. Thus, the data writing completion notification may be transmitted quickly to the host computer.

In writing data of the host computer 300 to the magnetic tapes assigned to the data, the order of data writing is optimized such that the number of times of magnetic tape replacement may be a minimum. This may reduce the writing waiting time for the magnetic tape replacement and allows efficient data writing to the magnetic tapes.

Third Embodiment

Summary of Third Embodiment

While a tape library controller is included in a host computer according to the second embodiment, a tape library controller is included in a tape library apparatus according to a third embodiment. The rest is the same as the second embodiment. In other words, according to the third embodiment, the components having the same names as those in the second embodiment have the same functions as those of the second embodiment and perform similar processing.

[Configuration of Tape Library System According to Third Embodiment]

Figure 10:
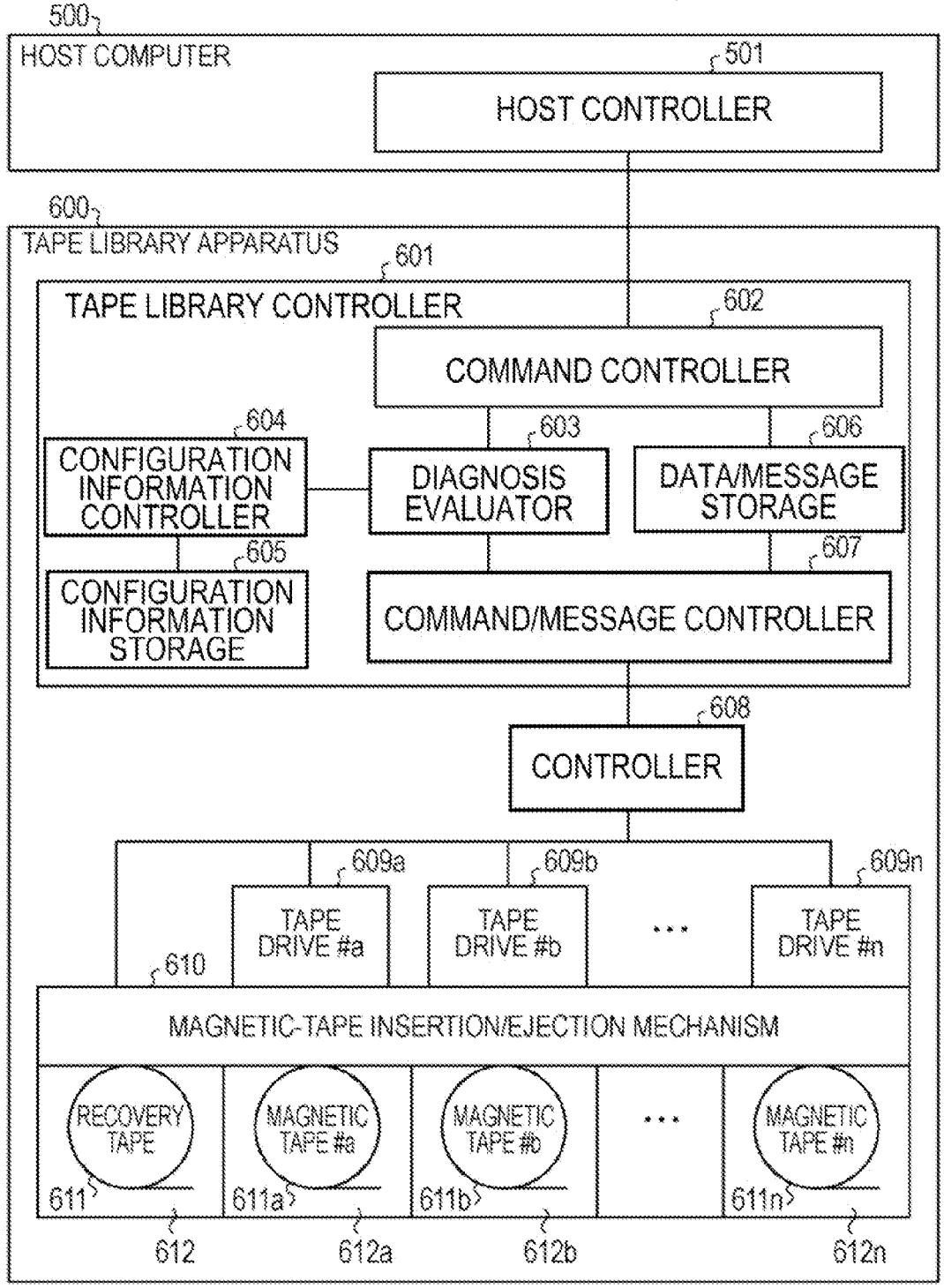
FIG. 10 is a block diagram illustrating a configuration of a tape library system according to a third embodiment.

FIG. 10 illustrates the diagram of the tape library system S3 according to the third embodiment. A host controller 501 in a host computer 500 is the same as the host controller 301 in the host computer 300 in the second embodiment.

A tape library controller 601 of the third embodiment includes a command controller 602, a diagnostic evaluator 603, a configuration information controller 604, a configuration information storage 605, a data/message storage 606, and a command/message controller 607. The command controller 602 is the same as the command controller 303 of the second embodiment. The diagnostic evaluator 603 is the same as the diagnostic evaluator 304 of the second embodiment. The configuration information controller 604 is the same as the configuration information controller 305 of the second embodiment. The configuration information storage 605 is the same as the configuration information storage 306 of the second embodiment. The data/message storage 606 is the same as the data/message storage 307 of the second embodiment. The command/message controller 607 is the same as the command/message controller 308 of the second embodiment.

The tape library apparatus 600 further includes a controller 608, a tape drive #a 609a to a tape drive #n 609n, and a magnetic tape insertion/ejection mechanism 610. The tape library apparatus 600 further includes a recovery tape 611 stored in a cell 612, and a magnetic tape #a 611a stored in a cell 612a to a magnetic tape #n 611n stored in a cell 612n.

The controller 608 is the same as the controller 401 of the second embodiment. The tape drive #a 609a to tape drive #n 609n are the same as the tape drive #a 402a to tape drive #n 402n of the second embodiment. The magnetic tape insertion/ejection mechanism 610 is the same as the magnetic tape insertion/ejection mechanism 403 of the second embodiment. The recovery tape 611 stored in the cell 612 is the same as the recovery tape 404 stored in the cell 405 of the second embodiment. The magnetic tape #a 611a stored in the cell 612a to the magnetic tape #n 611n stored in the cell 612n are the same as the magnetic tape #a 404a stored in the cell 405a to the magnetic tape #n 404n stored in the cell 405n of the second embodiment, respectively.

[Tape Library Apparatus Which Executes Magnetic Tape Use Processing Program According to Third Embodiment]

Figure 11:
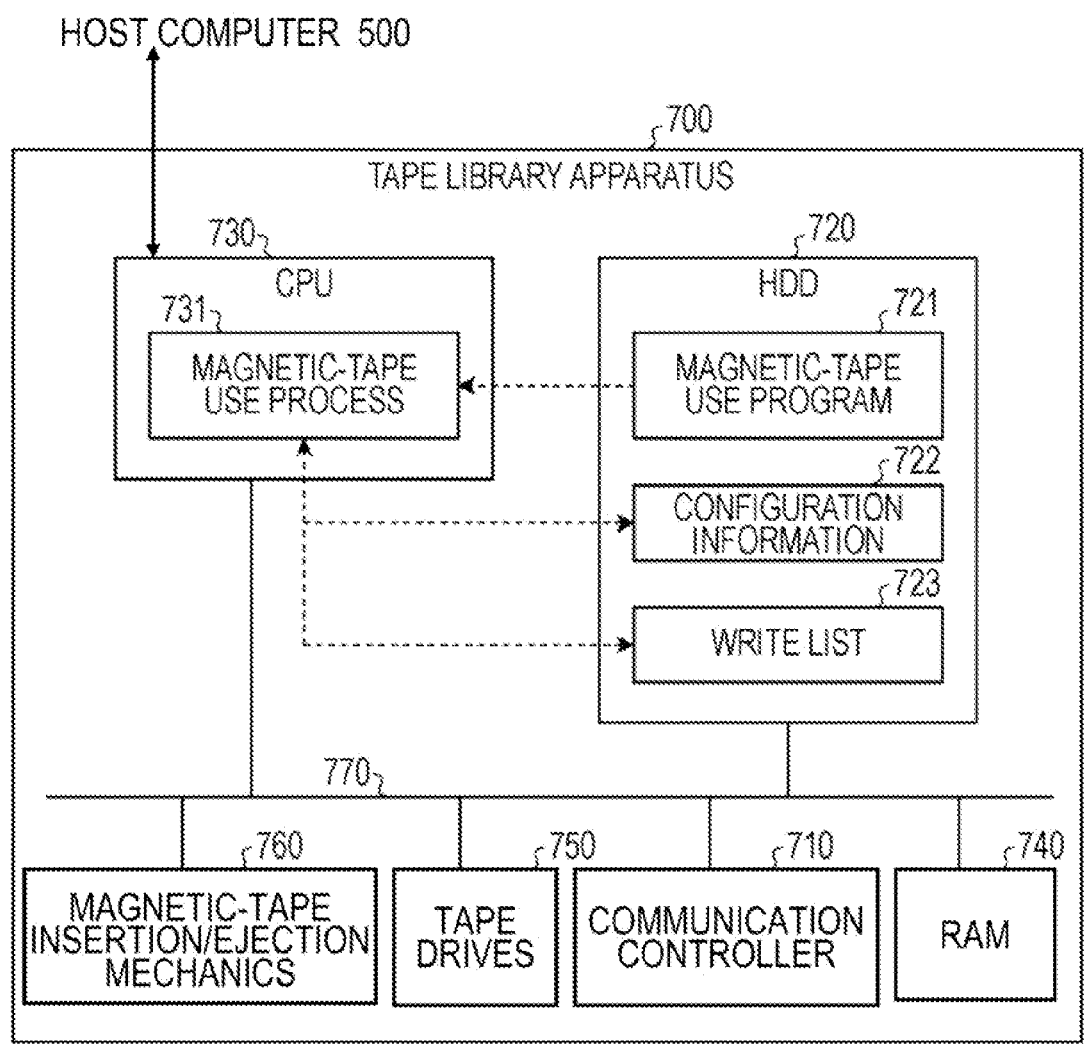
FIG. 11 is a diagram illustrating a tape library apparatus which executes a magnetic tape use processing program according to the third embodiment.

FIG. 11 illustrates a tape library apparatus 700 which corresponds in performance of the tape library apparatus to the tape library apparatus 600 in FIG. 10. However, the tape library apparatus 700 executes a magnetic tape use processing program in a manner different from the apparatus 600 as described below. The tape library apparatus 700 includes a communication controller 710, an HDD 720, a CPU 730, and a RAM 740, which are coupled each other via a bus 770. The HDD 720 stores a magnetic tape use program 721, configuration information 722, and a write list 723. The tape library apparatus 700 further includes a plurality of tape drives 750 and a magnetic tape insertion/ejection mechanism 760, which are connected via the bus 770.

The CPU 730 reads the magnetic tape use program 721 from the HDD 721 and executes it as a magnetic tape use process 731. The magnetic tape use process 731 performs mode determination processing illustrated in FIG. 5, magnetic tape writing control processing (recovery mode) illustrated in FIG. 6, and magnetic tape reading control processing (recovery mode) illustrated in FIG. 7. The magnetic tape use process 731 uses the RAM 740 as a temporary storage in performing processing and accesses the configuration information 722 and write list 723 in the HDD 720 as required. The CPU 730 controls the plurality of tape drives 750 and magnetic tape insertion/ejection mechanism 760.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A tape library control apparatus comprising:
   a configuration information storage configured to store configuration information on the number of available tape drives among a plurality of tape drives and the number of specific magnetic tapes, the plurality of the tape drives and the specific magnetic tapes being included in a tape library apparatus, the available tape drives being available for writing data to and reading data from each of magnetic tapes provided therein, each of the specific magnetic tapes being assigned for respective pieces of data sent by a host computer;
   a diagnostic evaluator configured to determine a use mode of the tape library apparatus on the basis of comparison between the number of the specific magnetic tapes and the number of the available tape drives and to output a request in accordance with the determined use mode, the use mode being selected from a first mode and a second mode, the first mode being selected when the number of the specific magnetic tapes is higher than the number of the available tape drives, the second mode being selected when the number of the specific magnetic tapes is lower than or equal to the number of the available tape drives; and
   a command controller configured to output in response to the request a command to the tape library apparatus to instruct, when the use mode is determined as the first mode, to write first data to one of the specific magnetic tapes and to write the first data to a common magnetic tape provided for writing the respective pieces of the data, the first data being sent from the host computer, the one of the specific magnetic tape being assigned for the first data.

2. The tape library control apparatus according to claim 1, wherein the configuration information includes information, notified from the tape library apparatus, on a failure in the tape drives and the number of the available tape drives is a difference resulting from subtraction of the number of failed tape drives from the number of the plurality of the tape drives.

3. The tape library control apparatus according to claim 1, wherein
   the command controller is further configured to output a command to the tape library apparatus to write the first data to the common magnetic tape by priority to the one of the specific magnetic tapes when the use mode is determined as the first mode, and
   the diagnostic evaluator is further configured to transmit to the host computer a notification of completion of processing of writing the first data in accordance with a reception of a message which is sent from the tape library apparatus and includes information on a completion of processing of writing the first data on the common magnetic tape.

4. The tape library control apparatus according to claim 2, wherein
   the command controller is further configured to output a command to the tape library apparatus to write the first data to the common magnetic tape by priority to the one of the specific magnetic tapes when the use mode is determined as the first mode, and
   the diagnostic evaluator is further configured to transmit to the host computer a notification of completion of processing of writing the first data in accordance with a reception of a message which is sent from the tape library apparatus and includes information on a completion of processing of writing the first data on the common magnetic tape.

5. The tape library control apparatus according to claim 1, wherein
   the command controller is further configured to optimize an order in which the respective pieces of data are written to corresponding ones of the specific magnetic tapes, the optimized order being determined so as to minimize frequency for inserting and ejecting the specific magnetic tapes to and from corresponding ones of the available tape drives on the basis of the number of the available tape drives and the number of the specific magnetic tapes.

6. The tape library control apparatus according to claim 2, wherein
   the command controller is further configured to optimize an order in which the respective pieces of data are written to corresponding ones of the specific magnetic tapes, the optimized order being determined so as to minimize frequency for inserting and ejecting the specific magnetic tapes to and from corresponding ones of the available tape drives on the basis of the number of the available tape drives and the number of the specific magnetic tapes.

7. The tape library control apparatus according to claim 3, wherein
   the command controller is further configured to optimize an order in which the respective pieces of data are written to corresponding ones of the specific magnetic tapes, the optimized order being determined so as to minimize frequency for inserting and ejecting the specific magnetic tapes to and from corresponding ones of the available tape drives on the basis of the number of the available tape drives and the number of the specific magnetic tapes.

8. The tape library control apparatus according to claim 4, wherein
   the command controller is further configured to optimize an order in which the respective pieces of data are written to corresponding ones of the specific magnetic tapes, the optimized order being determined so as to minimize frequency for inserting and ejecting the specific magnetic tapes to and from corresponding ones of the available tape drives on the basis of the number of the available tape drives and the number of the specific magnetic tapes.

9. The tape library control apparatus according to claim 1, wherein the diagnostic evaluator is further configured to transmit to the command controller a message in accordance with reception of a request for reading second data from the host computer when the use mode is the first mode, the message being for requesting an issuance of command for inquiring whether the second data is existing in the common magnetic tape or not, and the command controller is further configured to transmit a read command to the tape library apparatus, the read command including request to read the second data from the common magnetic tape when the second data is existing in the common magnetic tape and to read the second data from one of the specific magnetic tapes in the absence of the second data in the common magnetic tape, the one of the specific magnetic tapes being assigned to the first data.

10. The tape library control apparatus according to claim 2, wherein the diagnostic evaluator is further configured to transmit to the command controller a message in accordance with reception of a request for reading second data from the host computer when the use mode is the first mode, the message being for requesting an issuance of command for inquiring whether the second data is existing in the common magnetic tape or not, and the command controller is further configured to transmit a read command to the tape library apparatus, the read command including request to read the second data from the common magnetic tape when the second data is existing in the common magnetic tape and to read the second data from one of the specific magnetic tapes in the absence of the second data in the common magnetic tape, the one of the specific magnetic tapes being assigned to the first data.

11. The tape library control apparatus according to claim 3, wherein the diagnostic evaluator is further configured to transmit to the command controller a message in accordance with reception of a request for reading second data from the host computer when the use mode is the first mode, the message being for requesting an issuance of command for inquiring whether the second data is existing in the common magnetic tape or not, and the command controller is further configured to transmit a read command to the tape library apparatus, the read command including request to read the second data from the common magnetic tape when the second data is existing in the common magnetic tape and to read the second data from one of the specific magnetic tapes in the absence of the second data in the common magnetic tape, the one of the specific magnetic tapes being assigned to the first data.

12. The tape library control apparatus according to claim 4, wherein the diagnostic evaluator is further configured to transmit to the command controller a message in accordance with reception of a request for reading second data from the host computer when the use mode is the first mode, the message being for requesting an issuance of command for inquiring whether the second data is existing in the common magnetic tape or not, and the command controller is further configured to transmit a read command to the tape library apparatus, the read command including request to read the second data from the common magnetic tape when the second data is existing in the common magnetic tape and to read the second data from one of the specific magnetic tapes in the absence of the second data in the common magnetic tape, the one of the specific magnetic tapes being assigned to the first data.

13. The tape library control apparatus according to claim 5, wherein the diagnostic evaluator is further configured to transmit to the command controller a message in accordance with reception of a request for reading second data from the host computer when the use mode is the first mode, the message being for requesting an issuance of command for inquiring whether the second data is existing in the common magnetic tape or not, and the command controller is further configured to transmit a read command to the tape library apparatus, the read command including request to read the second data from the common magnetic tape when the second data is existing in the common magnetic tape and to read the second data from one of the specific magnetic tapes in the absence of the second data in the common magnetic tape, the one of the specific magnetic tapes being assigned to the first data.

14. The tape library control apparatus according to claim 6, wherein the diagnostic evaluator is further configured to transmit to the command controller a message in accordance with reception of a request for reading second data from the host computer when the use mode is the first mode, the message being for requesting an issuance of command for inquiring whether the second data is existing in the common magnetic tape or not, and the command controller is further configured to transmit a read command to the tape library apparatus, the read command including request to read the second data from the common magnetic tape when the second data is existing in the common magnetic tape and to read the second data from one of the specific magnetic tapes in the absence of the second data in the common magnetic tape, the one of the specific magnetic tapes being assigned to the first data.

15. The tape library control apparatus according to claim 7, wherein the diagnostic evaluator is further configured to transmit to the command controller a message in accordance with reception of a request for reading second data from the host computer when the use mode is the first mode, the message being for requesting an issuance of command for inquiring whether the second data is existing in the common magnetic tape or not, and the command controller is further configured to transmit a read command to the tape library apparatus, the read command including request to read the second data from the common magnetic tape when the second data is existing in the common magnetic tape and to read the second data from one of the specific magnetic tapes in the absence of the second data in the common magnetic tape, the one of the specific magnetic tapes being assigned to the first data.

16. The tape library control apparatus according to claim 8, wherein the diagnostic evaluator is further configured to transmit to the command controller a message in accordance with reception of a request for reading second data from the host computer when the use mode is the first mode, the message being for requesting an issuance of command for inquiring whether the second data is existing in the common magnetic tape or not, and the command controller is further configured to transmit a read command to the tape library apparatus, the read command including request to read the second data from the common magnetic tape when the second data is existing in the common magnetic tape and to read the second data from one of the specific magnetic tapes in the absence of the second data in the common magnetic tape, the one of the specific magnetic tapes being assigned to the first data.

17. A tape library control method executed by a tape library control apparatus for controlling the tape library apparatus, the tape library control method comprising:

analyzing, by the tape library control apparatus, information on configuration of the tape library apparatus to determine a use mode, the information on the configuration including information on the number of available tape drives and the number of specific magnetic tapes, the available tape drives and the specific magnetic tapes being included in the tape library apparatus, the available tape drives being available for writing data to and reading data from a magnetic tape included therein, each of the specific magnetic tapes being assigned for respective pieces of data to be sent by a host computer, the use mode being selected from a first mode and a second mode, the first mode being selected when the number of the specific magnetic tapes is higher than the number of the available tape drives, the second mode being selected when the total number of the specific magnetic tapes is lower than or equal to the number of the available tape drives;

outputting a command to the tape library apparatus, when the use mode is determined as the first mode, to instruct to write third data to one of the specific magnetic tapes and to a common magnetic tape provided for writing the respective pieces of the data, the one of the specific magnetic tapes being assigned for the third data sent from the host computer.

18. The tape library control method according to claim 17, wherein the information of the configuration includes information on a failure in the plurality of tape drives, the information being notified from the tape library apparatus, and the number of the available tape drives is a difference resulting from subtraction of the number of failed tape drives from the number of the tape drives.

* * * * *